US006789699B2

(12) United States Patent
Clark et al.

(10) Patent No.: US 6,789,699 B2
(45) Date of Patent: Sep. 14, 2004

(54) DISPENSER AND METHOD OF USE

(75) Inventors: Alisdair Quentin Clark, Aldershot (GB); Harry Read, Camberley (GB)

(73) Assignee: BP Oil International Limited (GB)

( * ) Notice: Subject to any disclaimer, the term of this patent is extended or adjusted under 35 U.S.C. 154(b) by 0 days.

(21) Appl. No.: 10/380,300

(22) PCT Filed: Aug. 29, 2001

(86) PCT No.: PCT/GB01/03848

§ 371 (c)(1),
(2), (4) Date: Mar. 12, 2003

(87) PCT Pub. No.: WO02/23138

PCT Pub. Date: Mar. 21, 2002

(65) Prior Publication Data

US 2003/0189063 A1 Oct. 9, 2003

(30) Foreign Application Priority Data

Sep. 15, 2000 (GB) ............................................. 0022710

(51) Int. Cl.$^{7}$ ................................................ G01F 13/00

(52) U.S. Cl. ............................... 222/94; 222/1; 222/95; 222/96; 222/105; 222/133; 222/134; 222/145.1; 222/145.5; 222/386.5; 222/386; 222/387; 222/389; 222/395; 222/401

(58) Field of Search ................................. 222/1, 94–97, 222/105, 106, 132–134, 144.5, 145.1, 386, 145.5, 387, 145.7, 389, 145.8, 394, 386.5, 395, 401

(56) References Cited

U.S. PATENT DOCUMENTS 1,707,058 A * 3/1929 Kauwertz ................... 137/266
2,529,028 A * 11/1950 Landon ....................... 222/57
2,578,994 A * 12/1951 Dunaway .................... 222/133
2,878,969 A * 3/1959 Griswold .................... 406/132
3,521,671 A 7/1970 Handeland ............... 137/564.5
4,089,437 A * 5/1978 Chutter et al. ................ 222/94
4,285,445 A * 8/1981 Vander Molen et al. ...... 222/49
4,635,848 A 1/1987 Little .......................... 239/10
4,699,298 A 10/1987 Grant et al. ................ 222/400
4,793,491 A 12/1988 Wolf et al. ................. 206/509
5,102,010 A 4/1992 Osgar et al. ................... 222/1
5,226,878 A 7/1993 Young ......................... 604/89
5,335,821 A 8/1994 Osgar .......................... 222/83
5,526,956 A 6/1996 Osgar .......................... 222/83
5,526,957 A * 6/1996 Brown et al. ................. 222/94
5,597,085 A 1/1997 Rauworth et al. .......... 220/403
5,875,921 A 3/1999 Osgar et al. ................... 222/1
5,886,957 A * 3/1999 Yokota et al. ........... 369/13.37
5,899,362 A 5/1999 Moran ........................ 222/136
6,015,068 A 1/2000 Osgar et al. ................ 222/400
6,055,831 A * 5/2000 Barbe ........................ 68/12.18

FOREIGN PATENT DOCUMENTS

DE 730397 12/1942
EP 0987215 3/2000
WO WO9837959 9/1998

OTHER PUBLICATIONS

RU 2070671 Abstract.
DE 3015813 Abstract.
DE 2553753 Abstract.

* cited by examiner

*Primary Examiner*—J. Casimer Jacyna
(74) *Attorney, Agent, or Firm*—Jennifer M. Hall

(57) ABSTRACT

An apparatus for containing a fluid, said apparatus comprising (d) at least two internal chambers, (f) a fluid product line leading from each chamber to (g) a junction for product lines from at least two of said chambers to produce a mixed product, (h) means for delivering a desired ratio of fluid products in said mixed fluid product, (i) an exit line from said junction for said mixed fluid product, and (j) means for reversibly closing said exit line.

24 Claims, 5 Drawing Sheets

DISPENSER AND METHOD OF USE

Figure 1:
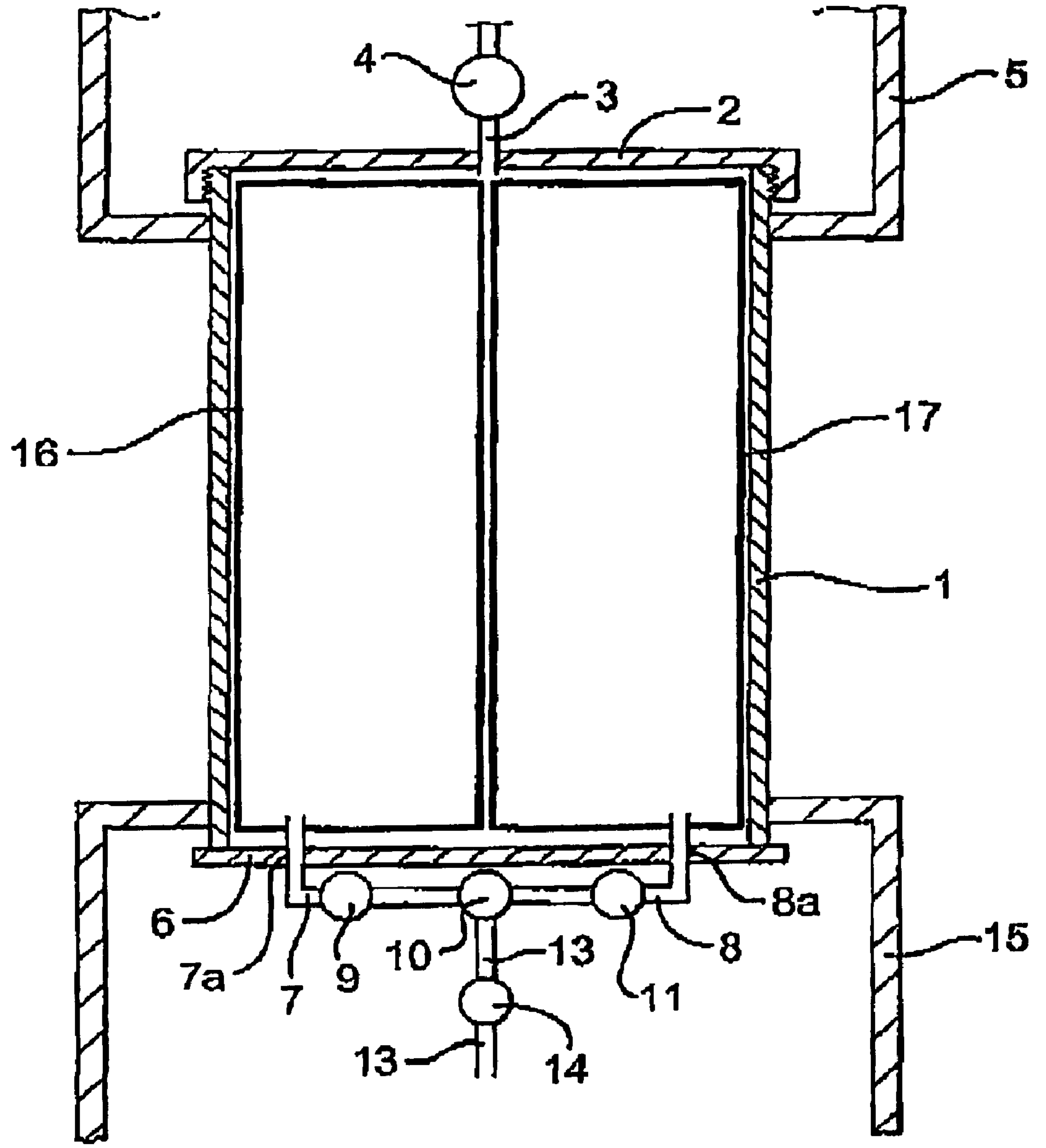

The present invention relates to dispensers for dosing fluids in controlled amounts into other fluids.

In many process operations, it is necessary to dose a specific amount of a particular additive into a large amount of a base fluid, either on a batch or continuous basis. These operations may involve dosing a product with a small amount of additive to stabilise the product or alter its performance. Examples of additives that may be used in such operations include antioxidants, thermal stabilisers, pour point depressants, viscosity modifiers, de-icing additives, octane/cetane boosters and detergents. Examples of products that maybe treated with additives include molten polymers and hydrocarbon fluids, such as crude oil and crude oil derivatives, for example, gasoline and diesel.

It is often difficult to dispense the additive routinely at the correct dosage rate, particularly, when more than one additive is required. The operation is especially difficult when the relative ratio(s) of the dosing rates of the two (or more) additives is important.

The present invention provides a dispenser capable of dispensing at least one, preferably, two or more additives at a substantially constant ratio.

The present invention provides an apparatus for containing a fluid, said apparatus comprising (a) a wall defining (b) an interior, which comprises (c) at least one collapsible partition, which, with said wall, itself or another of said partitions defines (d) an internal chamber in said interior, (f) a fluid product line leading from the internal chamber to an exit line, and (j) means for reversibly closing said exit line.

In a preferred embodiment, the apparatus comprises:

(a) a wall defining (b) an interior, which comprises (c) at least one collapsible partition which with said wall or another of said partitions defines (d) at least two internal chambers in said interior, optionally (e) at least one means allowing transmission of pressure across said wall, (f) a fluid product line leading from each chamber to (g) a junction for product lines from at least two of said chambers to produce a mixed product, (h) means for delivering a desired ratio of fluid products in said mixed fluid product, (i) an exit line from said junction for said mixed fluid product, (j) means for reversibly closing said exit line.

In another embodiment, the wall (a) defining the interior (b) and collapsible partition (c) need not be present, so the combination of the invention comprises (d) at least two chambers, (f) a fluid product line, (g) a junction line (g) delivery means (h), exit line (i) and reversible closure means (j). Preferably the combination is supported by a frame (k) at least partly surrounding chambers (d). As an alternative to the frame (k), other support means (l) (eg framework (m)) may be provided under the chambers (d). The framework (m) may take the form of a pallet base, for ease of movement. The other features (f–j) may then be protected or located in the support framework. Features d–j may otherwise be as described herein, apart from those requiring attachment to or bearing upon the container wall. The frame k may be open and may be rectangular for ease of transport and stacking, in particular may have an open frame on the bottom and sides of the chambers in use, but with an open top to allow access and action on the chambers to cause their depression e.g. via a plate and a heavy weight e.g. bricks, or full drums or a standing person.

The apparatus above (also referred to as "container") may not be pressurizable to above 1.1 bar. Alternatively, the container may be so pressurizable, with the wall (a) and the interior (b) being closed, apart from the product line (f), junction (g) and/or exit line (i). Where the container is pressurizable, the wall (a) may be pressure resistant.

The apparatus of the present invention may further include an external chamber for containing the container. The container may have the wall (a), interior (b), partition (c), chambers (d), optional pressure transmission means (e), and product line (f). The external chamber section, on the other hand, may comprise the exit line (i) and the closure means (j).

The apparatus of the present invention is particularly useful for dosing mixed products into a line carrying flowing fluid. When used for such a purpose, the container is preferably pressurizable. Preferably also, the exit line (i) is capable of being brought into fluid communication with the main line.

In a modification of the apparatus described in the preceding paragraph, the main line has a side line in a loop between upstream and downstream locations. The container preferably bridges the loop and main lines. Where a pressure transmission means is employed, it is preferably capable of being in fluid contact with the interior of said main line. The exit preferably leads to the side or main line.

The present invention also provides a method of dispensing at least two fluids into a third fluid, wherein said fluids are separately contained in chambers in a container of the present invention, said method comprising applying pressure to said pressure transmission means (e) causing at least partial collapse of at least one partition and egress of said fluids from said chambers with said product lines, passing said fluids through said lines to meet at said junction, and pass through said exit line into said third fluid.

The container may be of any shape, for example, with sharp or rounded edges. The container may have a rectangular or square cross section. Preferably, the container has convex rounded surfaces on at least some sides, especially on one pair of opposing sides. The container may thus be a sphere or especially a drum having convex sides, and a top and bottom which may be planar or slightly convex meeting the sides at a distinct ridge, or may be completely curved meeting the sides colinearly e.g. with hemispherical ends. Both the inside surface and the external surface may have the shapes described above, but preferably the inside surface does, while the external surface is fitted with at least one external stabiliser, e.g. an outwardly extending circular collar and/or legs on the top and/or bottom to allow it to stand upright; said collar and/or legs preferably extend beyond the outermost part of the curved container wall. Advantageously, the container has the stabilisers present on opposing ends of the container. The pressure transmission means (e) are preferably located inside the area of the top end of the container defined by the collar or legs so is protected at least partly. At least one of junction (g) exit line (i) and closure means (j) are preferably located externally of the container but inside the area of the bottom end of the container defined by the collar or legs.

In a preferred form, the container is not sealed, so is not pressurizable to a pressure above 1.1 bar. In this case the container of the invention has features (a), (b), (c), (d), (f), (g), (h), (i) and (j) means for reversible closing said exit line. Any joints through the container wall, need not be pressure resistant e.g. where lines pass through the container wall; seals are not essential and maybe absent. The description of these features in this specification apply in general to the unsealed containers as well as the sealed ones, unless otherwise mentioned. The mixing of the contents of the chambers and ejection of the product into the exit line is usually under the influence of gravity, though this may be aided as described further below. Preferably the container of the invention has features (a)–(d) inside its wall, especially (a)–(f), and in particular (a)–(g) so that only the one exit line (i) projects outside the container.

The container may be provided with means for indicating the volume of fluid contained in the container. For example, at least part of the container's wall may be transparent so that the interior of the container is at least partially visible.

The container may be made of metal, e.g. steel or aluminium, or plastics material. Preferred plastics materials include engineering plastics, such as a polyalkene e.g. polypropylene, or polyamide e.g. a nylon or polyester e.g. polyethylene terephthalate. If desired the pressure resistant wall may be made of one of the above materials especially steel and the stabiliser e.g. collar or legs may be made of another e.g. aluminium or nylon.

When the container does not need to have a pressure resistant wall, it is preferably a cylindrical drum e.g. of 100–5001 capacity e.g. 200–2501. The drum usually has a first hole in its curved side, and may also have a second hole in an end face. Preferably the product lines (f) and/or exit line (i) pass through one of those holes especially the first hole, so in use the drum is on its side with the first hole downwards and the internal chambers directly above it. The first hole is preferably closed by means of the cover member as described further below. If desired the second hole can be used to manipulate the correct location of full bags onto the product lines or can be used to activate leverage devices to press on the bag contents. If desired the roles of the first and second holes can be reversed. The drum may also have the first hole in its curved side, but an open end, closable with a lid, which end may also be used for manipulation or leverage, as described above.

The container wall is preferably resistant and impervious to any internal pressure encountered during its use, which may be 1–20 bar, e.g. 2–10 bar. Internal or external reinforcement to the wall maybe provided if required, e.g. in the form of one or more external straps.

The wall defines the interior (b) of the container. Inside there is at least one collapsible partition and at least 2 internal chambers whose contents are incapable of direct fluid communication with each other except via lines (f) and junction (g). There may be 2 or more e.g. 2–4 chambers each defined by a flexible and collapsible wall of an internal container e.g. a bag such as one of plastics material e.g. polyethylene, impervious to the material to be received in it in use. In this case the container of the invention has within wall (a) 2 or more plastics bags, each separate from the other, but each joined to a product line (f) leading to the junction (g). The total volume of the bags when full may be the same as the internal volume of the container of the invention, or may be smaller than this. In the latter case, the space between the flexible walls and the internal wall (a) may if desired itself be used for receiving material when the container is in use; the space is then open to a product line (d) of its own leading to junction (g). In these forms of the container of the invention, the application of pressure at (e) causes the contents of the 2 or more chambers to be expelled into the product lines, either via pressure on the flexible walls of the bags causing the bags to shrink in volume by collapsing in on themselves (i.e. substantially normal to their surface) and/or by pressure directly on the material in the space again causing the expulsion. The internal containers e.g. bags may be discrete from one another and independently movable with respect to each other, or at least one may surround another, e.g. with 2 bags one inside the other. In the latter embodiment there are 2 product lines one from each bag, especially with one line surrounding the other, the contents of the internal bag passing through the centre of the overall product line and the contents of the surrounding bag passing through a product line in an annulus to the internal product line. The same arrangement happens in an alternative embodiment when the internal container for one fluid material is surrounded by the space (to the wall (a)) for receiving a second material, so the space is defined by an annulus surrounding the flexible wall of the first internal container.

The collapsible partition may constitute the whole of the wall of the internal chamber, e.g. as with a plastic bag. But the collapsible partition may only constitute part of said wall, the remainder being part of the wall (a) or part of a rigid wall capable of moving relative to said wall (a), e.g. as in a piston head (as described further below); in this case the collapse may be normal to the partition surface as with the bags or substantially parallel to the surface as in a concertina partition or bellows.

The internal chambers in the optionally pressurisable container may be of a number of relative maximum volumes. Usually they may have relative volumes the same as the relative ratios of the fluids being blended, so that as the fluids are removed, the chambers shrink in volume to the same extent and ultimately both chambers have the same minimum volume, approaching zero. The relative weight ratios of additives in the fluid products going to the junction g may be the same as the relative volumes of fluid products going there, and this is useful when comparable concentrations of the additives and weight ratios of about 1:1 e.g. 0.8–1.2:1 are used. But when only a small weight ratio of additives is wanted e.g. additive A to B, it may be preferably to dilute the additive in lower proportion i.e. A so that the volume ratios of fluid products are more comparable, as this aids more accurate ratio mixing. Thus the weight ratios between 2 additives may be 1:10 to 10:1, but the volume ratios of the corresponding fluid products maybe 1:5 to 5:1, but preferably 2:1 to 1:2.

Each product line (f) is sealingly fitted to each chamber (d) and leads therefrom to junction (g), to allow the contents of chamber (d) to flow to junction (g). The line (f) may be attached to a hole in the partition or may itself pass through said hole into the chamber; either of these approaches may be used to empty the contents of chambers which are discrete internal containers e.g. bags. The line f may simply pass through the wall and into the chamber when the latter is defined by the wall (a) and one or more partitions (c). Thus in the latter case, with a collapsible partition defining a first chamber which is surrounded e.g. annularly by the second wall chamber, the product line for the first chamber may be separate from or inside the product line from the second chamber.

The optional pressure transfer means (e) may constitute a pipe optionally reversibly closable, leading from the outside of the wall (a) through said wall to inside the interior of the container. The internal end of the pipe may be located in a space external of said chambers and defined by the collapsible partition and said wall (a); in this case the chambers are preferably in the form of collapsible bags. The internal end of the pipe may also be located in a space external of said chamber and defined by the wall (a) and a transmission plate, which itself is capable of acting on the collapsible partition defining the bags and the space (which may be annular) between said partition and said wall, said latter space being optionally adapted to receive material in use. The transmission plate may thus be a piston head acting either on the bags alone, or on the bags and on the material surrounding the bags but separated therefrom by the partition. If desired the pressure transfer means (e) may constitute said transmission plate attached to a shaft movable through said wall (a) under the influence of external pressure applied to said shaft or a piston plate attached thereto.

The product lines meet at one or more junction(s) (g). When there are three or more product lines, all may meet at one junction (g) or two or more may meet at a first junction (g) and then the exit line from said first junction (g) may lead to a second junction (g) where one or more other product lines (f) meet it. By this means the products in the lines may be mixed together either directly or step wise. Thus junction (g) may have 2 or more inlets for attachment to product lines (f) and at least one exit line for mixed product. The exit line may also be provided with a junction, which is preferably, provided with a valve. An additional container may be coupled to this junction, such that two containers may be coupled to the same exit line. This may be useful when one container is running low, and the other is still full. When the former is depleted, the valve in the junction may be actuated disconnect the depleted container from the exit line, and connect the full container to the exit line, ensuring that supply of container fluid to the exit line is continuous.

In one embodiment, the apparatus is provided with more than one exit line. For example, each product line may lead to an exit line.

There is also means (h) for delivering the fluid products in the desired ratio, which may be fixed or variable. This means controls the blending ratio. Fixed ratios may be obtained by use of product lines (or inlets to the junction (g)) of defined cross sectional area at their narrowest points. Those areas may themselves be in the desired ratio, especially for use with materials in the container of similar viscosity, or in a ratio such that with materials of defined viscosity, the materials will pass through the lines and inlet in the desired ratio, especially at the usual temperature of use. If desired the product lines (and/or junction (g)) may be insulated to reduce the possibility of effects of changing temperature on viscosity (and hence flow) rate and ratio.

Variable ratios for the amounts of the fluid products may be obtained by use of at least one valve, capable of allowing different flow rates of material through it. There may be a valve on each of 2 or more product lines (f), the position of the valve (i.e. its degree of opening) being capable of being varied to give different overall ratios at the junction (g). As well or alternatively the junction (g) may itself be in the valve, which is a proportioning valve capable of adjustment to allow different flow rates through different inlets.

If desired at least one (and preferably all) product line (f) may incorporate a one way valve to allow egress of material from the internal container but no return of it or other material.

The exit line from the or the last junction (g) in a downstream direction may also incorporate a one way valve to allow movement of mixed product downstream but not allow any return upstream. The exit line also incorporates a reversible closure means e.g. valve to allow separation of the container from the main line, e.g. for removal or refilling, or for circumstances when no addition to the line is required.

The optionally pressurisable container of the invention comprises at least 2 fluid product lines (f), a junction (g) and an exit line (i); these may be in different spatial relation to the container, particularly when the container has at least one external stabiliser, e.g. the collar or legs. The inner walls of the collar or by the inside of the legs, together with part of the outer wall of the container defines an external chamber, whose face opposed to that of the outer container wall may be open to the outside or reversibly closable e.g. with a panel or lid, the external chamber being adapted to allow one or more lines to leave it. This external chamber may contain one or more product lines (f), with the junction (g) and exit line and closure means outside said chamber, or one or more junctions g may be inside said chamber as well and the exit line and closure means may be outside, or the product lines, junction g and at least part of the exit line may be inside and the remainder of the exit line and closure means may be outside. The one way valve on the exit line may be inside or outside the external chamber. Finally if desired lines f and i and junction g and closure means j may all be inside said external chamber. The external chamber is usually non pressurisable.

The product lines (f) and if necessary exit line (i) pass through the container wall, preferably in a sealing fit. Thus the container may have at least one orifice, either one for each line (f) and if necessary line (i), or all the lines may pass through the same orifice. The container wall preferably has a hole therein, through which the line(s) pass. Preferably the line(s) pass through orifice(s) in a cover member removably retained in place to sealingly cover the hole. The cover member may be a plug friction fitted in the hole directly or via a surrounding annular flexible grommet. The cover member may also be retained in the hole by means of an external thread thereon engaging a corresponding internal thread of the container or of a flange defining the hole and mounted on or in the container. The cover member may also be urged towards a cooperating flange defining the hole and mounted on the container, via flexible retaining means e.g. spring clips mounted on the cover member, container or flange, and separated from the flange by a flexible ring e.g. an O ring. The above cover members are preferably plates with orifice(s) therein. Alternatively the cover member may be urged towards a cooperating flange defining the hole and mounted on the container, the member being retained on the container by a threaded cap, either directly or indirectly. In the direct case, the cap is annular, the centre thereof allowing freedom for the lines to pass through and has a dependent, internally threaded rim portion adapted to engage a cooperating externally threaded flange on the container. Flexible sealing means e.g. an O ring or washer may be retained between the cap and cover member or cover member and flange, or both. In the indirect case, the annular cap is as described above but the internally threaded rim engages not the flange but a bi threaded annular insert, via an externally threaded broader portion thereof while an externally threaded narrower portion thereof is adapted to engage the threaded flange. The annular insert may be separated from the cover member by the flexible means e.g. as described above, or may itself have a recess in the axial face of the broader portion adapted to receive that flexible means. In the direct or indirect case the cover member may be as described above but preferably in the latter case the member is in the form of a plug with orifice(s) for the lines through it and preferably of shape adapted to be received inside the annular insert. Thus the plug preferably has a radially extending lip to bear upon the broader portion of the insert and a shank to be received inside the narrower portion of the insert; axially through the shank are the orifices which may be of uniform cross section but are preferably of broader cross section on the outer side distant in use from the container, and of narrower cross section on the inner side nearer in use to the container. The product line and/or exit line may pass through the orifices, or an external product line of one width may be inserted and fixed into the outer orifice(s), and an internal product line of narrower width may be inserted and fixed e.g. threaded into at least one of the internal orifice(s). To at least one of to the internal product lines is attached at least one means defining the internal chamber e.g. a plastic bag.

The junction (g) may be inside the container wall or outside it, but near to it so that the exit line (i) is also near the container wall. To protect it a protection cap e.g. hemispherical or cylindrical cap may be mounted on the container to cover the product lines and junctions and to allow the exit line to project through it; the cap may be a friction fit on appropriate lugs or receiving means e.g. the flange, on the container or may be screw threaded to the container or said receiving means. The protective cap also fits over the cover members as described above.

The apparatus for dosing mixed products to a main line comprises the optionally pressurisable container of the invention joined to said main line by way of the exit line. In this instance there is also preferably provided a source of pressure to act on the pressure transmission means (e) to result in flow of product to junction g and hence the exit line and into the main line, in order to overcome the back pressure in the main line. Preferably however the main line has a side line leading to the pressure transmission means which alone or with a source of extra power results in ejection of the mixed product into the main line; the effect of the side line is more closely to balance the pressures on either side of the lines in the pressurisable container and hence reduce the amount of extra power required. The side line may just extend from the main line to the means (e) to exert the pressure from the main line on it; alternatively the side line may extend in a loop returning to the main line. A spur from the side line passing to said means e, so the pressurisable container bridges the loop.

The exit line (i) usually has a small pump or other means for moving mixed product into the main line, especially a positive displacement pump.

If desired the joint between the exit line and main line may be in a location in the main line of reduced pressure e.g. at or downstream of a constriction in said main line causing suction to help remove fluid from the exit line; thus the exit line may meet the main line at a Venturi constriction.

The products in each internal chamber are fluids, usually liquids, including solutions, such as solutions of additive(s) in one or more miscible solvents, such as water, or lower alcohols esters or ketones. The additive may be any of those mentioned above or others for use in the fluid of the main line. The fluid in the main line is usually a liquid e.g. a water or hydrocarbon based fluid, especially the latter, such as an aviation fuel, such as jet fuel, kerosene or aviation gasoline.

In use, each internal chamber with its contents is located in the interior (b). A portion of the wall of the container is preferably reversibly but sealingly openable e.g. removable to allow insertion of the filled chamber such as a filled bag of fluid product or to allow access to said chamber, depleted of product, in order to refill it. If desired the chambers may be filled externally through the exit and product lines so long as the effect of any one way valves is negated i.e. overridden and valves are present to allow inward movement of fluid completely to each chamber in turn, without simultaneous movement of fluid to another chamber.

The filled internal chambers are joined to their product lines and hence to the junction and exit line, which is in turn joined to the main line. Passage of the fluid in the main line is started and pressure is applied to means (e), whether by fluid in the side line or otherwise e.g. a source of compressed gas such as inert gas (e.g. nitrogen). The pressure causes the partitions to collapse either normally as in collapsing bags or concertina fashion, thereby expelling their contents into their product lines to junction g and hence to exit line and into the main line. The means (h) ensures that the correct ratio of fluid products is fed into the main line. Variations in the pressure in the main line may cause variations in the absolute amount of the fluid products fed, but not their ratio to each other or their ratio to the fluid in the main line. With the use of the side line to the pressurisable container, pressure surges in the main line usually do not cause back flow into the pressurised container, and pressure drops do not cause increases in absolute amount added to the main line. Pressure surges may also be compensated for by connection of a pressure measurement device upstream in the main line to the closure means from the pressurised container, measured variations in pressure acting on the closure means so the latter can act as a variable flow exit valve.

In the cases when the container is not pressurized to eject the contents of the internal chambers, those contents may flow under the influence of gravity, once internal and external closures on the product and exit lines are open (e.g. means (j)), assuming a low enough viscosity of the contents at operating temperature e.g. −20° C. to +80° C., e.g. 10–50° C. If required, a positive displacement or suction pump on the exit line will help remove the contents. However, it is preferable to push the contents out rather than relying solely on gravity or suction. Thus the chambers have a force applied to them, either separately to each chamber e.g. each bag but preferably to both chambers (or more) especially when the chambers extend in the container to a comparable level so a single plate can bear onto both (or more chambers). The force may be applied towards the mixing junction (g) or product lines all the time or only when blended product is required. Thus a weight may be placed on the bearing plate or a spring in compression may be located between the plate and the opposed wall of the container distant from the junction or product lines. Preferably the force is applied when required, but not applied otherwise. Methods of achieving the force include a screw press with threaded hole in the container wall engaging a threaded shaft which bears on the plate or a piston one of whose ends bears on the plate and the other end carries a handle, or a levered arrangement where movement of one end of a lever e.g. depression causes the other end of the lever or preferably an intermediate point in the lever (or rigid arm thereon) to bear on the plate. The bearing plate may be constrained to move in a linear direction normal to the bags by side guides mounted on the container inside wall engaging corresponding lugs on the plate. The side guides extend at least the height of the chambers in the container and when the plate reaches the bottom of the guides and the chambers are empty, this fact can be communicated to outside the drum by means such as the lugs also moving a slot in an external guide, or lugs being visible through a vertical slot in the container wall or via other marker moving with the lugs.

An alternative method of applying a force is to place a full container on top of a container which is being used.

It should be noted that the apparatus may be provided with means for insulating or incubating at least part of the apparatus. For example, the internal chamber of the container may be insulated or incubated against extreme fluctuations in temperature, or kept at a particular temperature range. This may be useful when the apparatus is employed in extreme temperature conditions, for example, extremely low temperatures. Under such conditions, the fluids contained in the containers may become too viscous to be deployed.

The apparatus of the present invention may be used to contain additives, such as fuel or lubricant additives. Examples of such additives include lubricity improvers, flow improvers, thermal stability additives, antioxidants, pour point depressants, viscosity modifiers, de-icing additives, octane/cetane boosters, antifoams, demulsifiers, corrosion inhibitors, drying agents and detergents. Such additives may be added to fuels and lubricants. Suitable fuels include both liquid and gaseous fuels, such as natural gas, liquefied gas, motor and aviation gasoline, diesel, jet fuel, heavy fuel oil, marine fuel oil and kerosene. Suitable lubricants include those for motor vehicles, aircraft and industrial applications.

Where the containers of the present invention are used to deploy aviation fuel or lubricant additives, they may be stored directly on-board the aircraft, for example, in the wing of an aircraft, and operated remotely, for example, by the pilot from his/her cockpit.

The invention is illustrated in the accompanying drawings in which

Figure 2A:
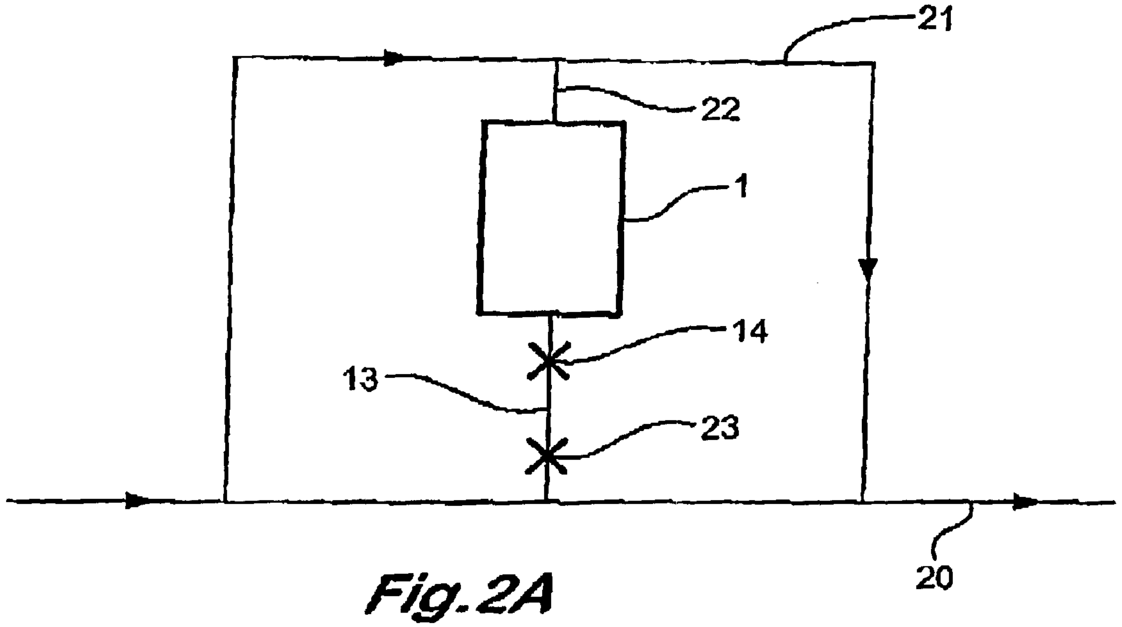
Figure 2B:
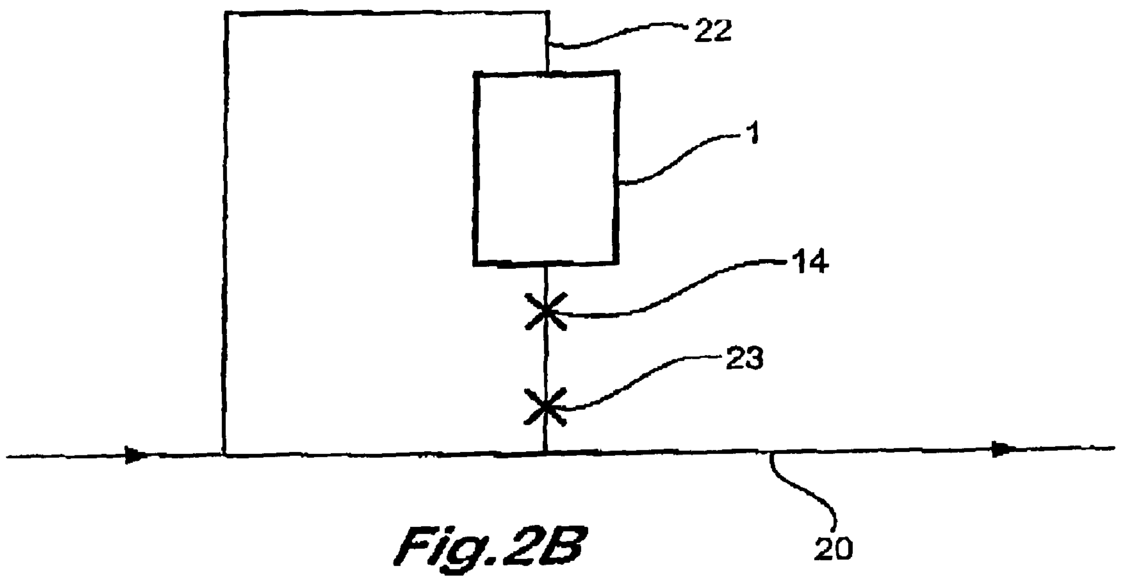
Figure 3:
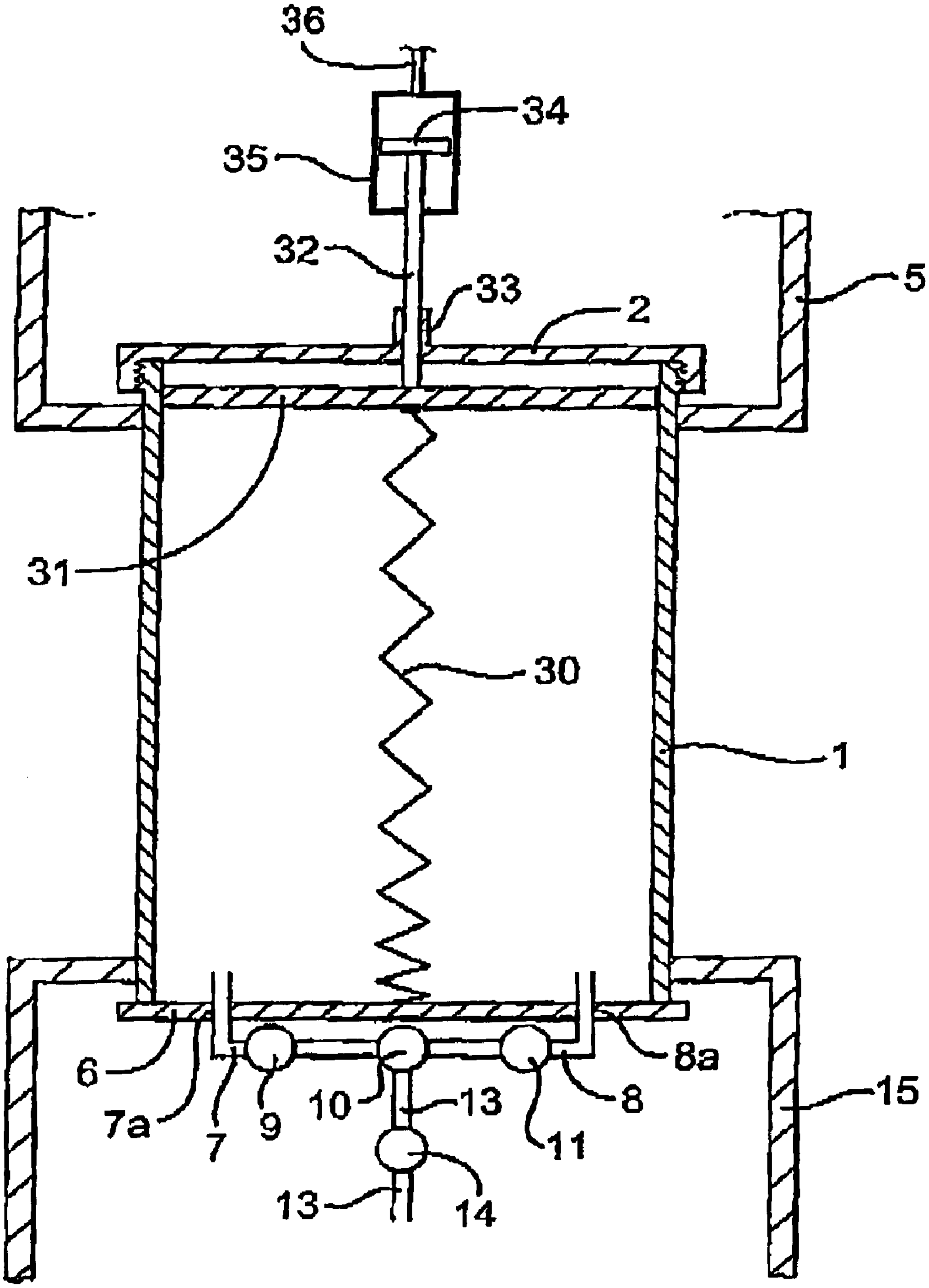
Figure 4:
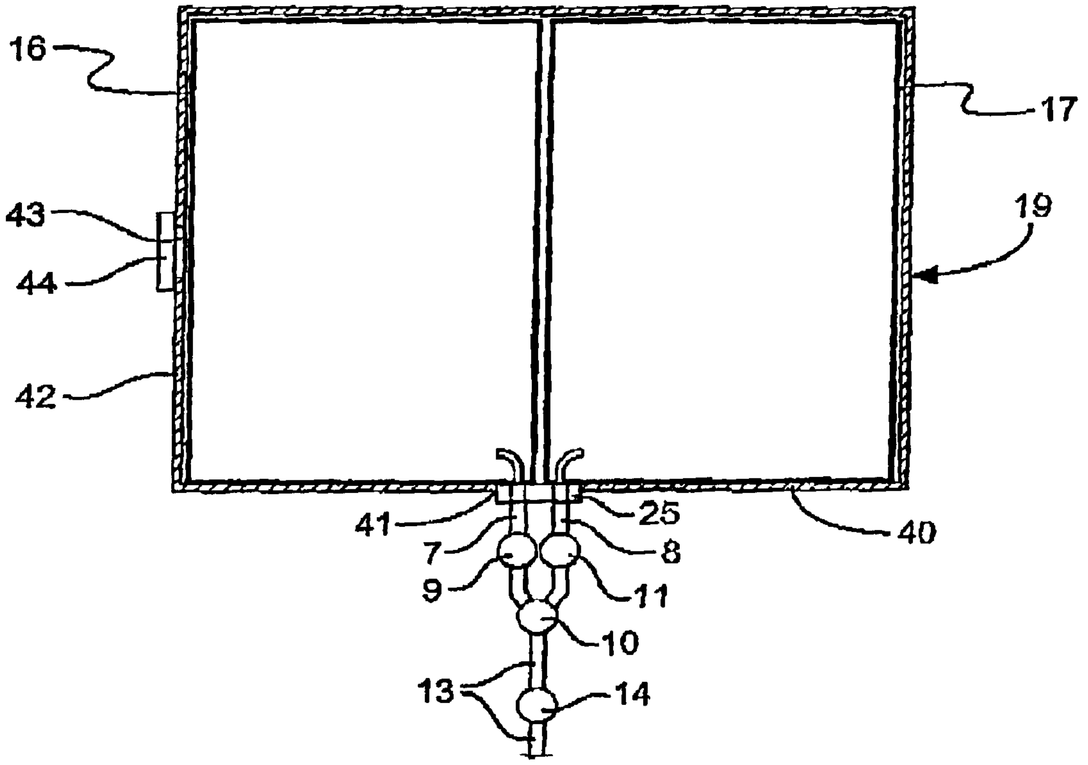
Figure 5:
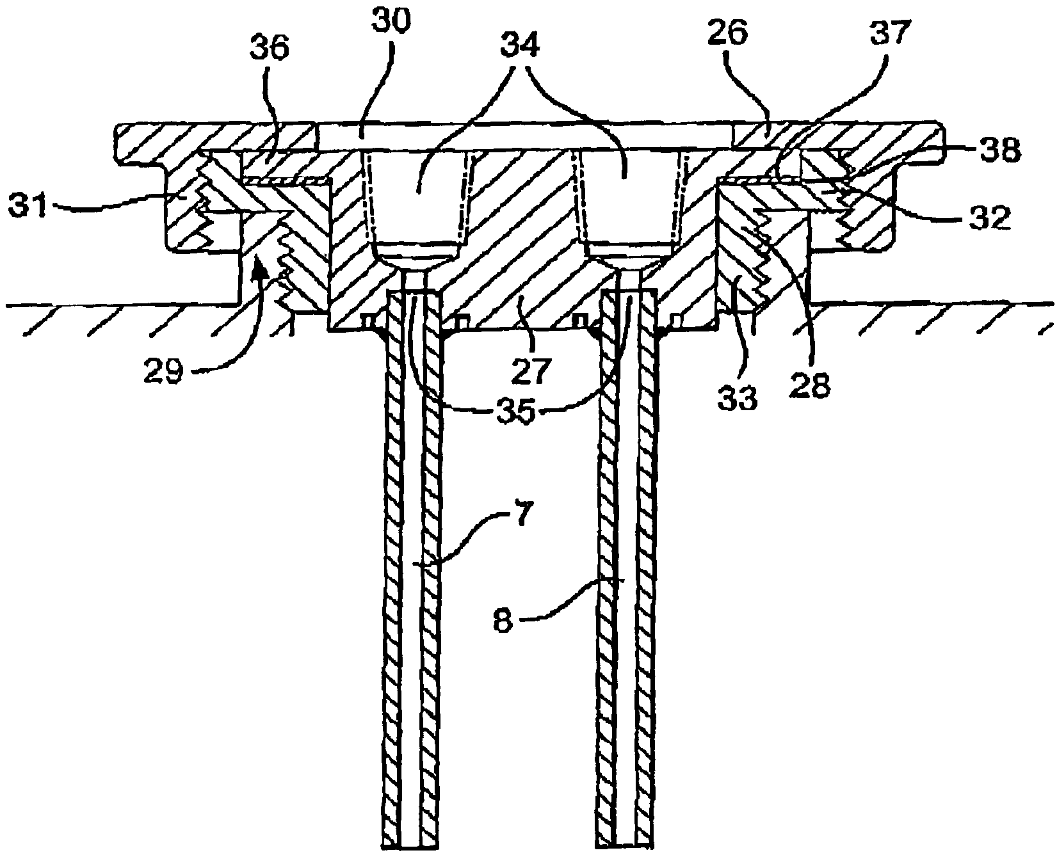

FIGS. 1 and 3 represent partly schematic longitudinal sections through containers of the invention and FIGS. 2A and 2B are flow diagrams showing the container in use, while FIG. 4 shows another embodiment of the invention and FIG. 5 a cross section through a cover to a container of FIG. 4.

Refferring now to FIG. 1, a container 1 of pressure resistant metal is externally threaded to engage with a threaded cap 2, through which sealingly passes an entry pipe 3 attached to an entry valve 4. A skirt 5 extends around the cap 2 from the container 1 outwardly and longitudinally beyond the axis of valve 4. At the opposite end of container 1 is a second cap 6 retained by means of spring clips extending from container 1. Through cap 6 sealingly pass a first feed pipe 7 and second feed pipe 8. Pipe 7 leads via first feed valve 9 to a 3 way junction 10, to which pipe 8 leads via second feed valve 11. From junction 10 leads exit line 13 to exit valve 14. Junction 10 is a 3 way junction which may be completely open to lines 7, 8 and 13 or may be a proportioning valve to ratio the amount of material passing through lines 7 and 8. A second skirt 15 extends around the lines 7, 8 and 13 from container 1 outwardly and longitudinally beyond valve 14. Skirts 5 and 15 may each completely surround the container, or may be in sections with a non continuous periphery (e.g. in the form of 4 legs) and/or each skirt or section may be integral or may have one or more internal gaps to provide hand holes or holes for use with mechanical handling devices. Pipe 7 is sealingly fixed to a flexible bag 16 while pipe 8 is sealingly fixed to a flexible bag 17, which when full occupy essentially all the space inside container 1. Pipes 7 and 8 are attached to bag 16 and 17 respectively, pass sealingly through cap 6 and thence via connections (not shown) to valves 9 and 11 respectively.

If desired cap 2 may be sealed to container 1 rather than being threadedly attached (not shown) or cap 6 may be sealed to container 1 rather than being attached as shown.

In use container 1 is inverted from the position shown in FIG. 1 onto its skirt 5, cap 6 is removed from container 1 but cap 2 is retained. Bag 16 full of first fluid feed product with feed line 7 attached at one end and bag 17 full of second fluid feed product with feed line 8 attached at one end are inserted into the container and lines 7 and 8 passed through respective holes 7*a* and 8*a* in cap 6, through which they sealingly pass with the aid of sealing bushes or plugs 1 (not shown). Cap 6 is then re-sealed in place on container 1 via the spring clips (not shown). Preassembled apparatus comprising lines 7, 8 and 13 and valves 9, 11 and 14 is connected to lines 7 and 8 respectively via connectors. Valve 14 is closed. Valves 9 and 11 are adjusted to allow proportionate flow through lines 7 and 8 respectively; alternatively valves 9 and 10 are left open and junction 14, which is a proportioning valve, is adjusted to allow the desired relative flows. Filled container 1 is then inverted onto its skirt 15 as shown and is ready for use.

Referring now to FIG. 2A a main line 20 has a loop line 21, between which is located pressure line 22 attached to entry valve 4 of container 1 (FIG. 1) and exit line 13 from exit valve 14 of container 1 (FIG. 1). Passage of fluid in main line 20 creates pressure in line 22 which in turn compresses bags 16 and 17 (FIG. 1), forcing their contents via lines 7 and 8 in the desired proportions through valve 14 and line 13 into main line 20. A one way valve 23 is downstream of valve 14. In FIG. 2B, the line 21 does not constitute a loop but its contents apply their pressure directly on entry valve 4.

Referring now to FIG. 3, which represents a modification of the container of FIG. 1, all the features of the container of FIG. 1 are retained apart from bags 16 and 17 and entry line 3 and valve 4, so will not be described again. Instead of separate bags 16 and 17 for containing the fluid feeds, there is a flexible concertina or bellows partition 30 extending the full length of the interior of the container and sealingly separating it into 2 sections, one for each of the fluid feeds. There is also an interior piston head 31 extending across the interior width of container 1 and sealingly movable with respect to the interior walls preferably via guides (not shown). The piston head 31 is attached to a shaft 32 extending through a hole 33 in cap 2. Shaft 32 ends in an exterior piston head 34 inside a piston 35, having a pressure inlet 36.

The container of FIG. 3 is used in the same way as that of FIG. 1 apart from the use of the piston and the flexible partition. Instead of inserting filled bags 16 and 17 into the container, the partition is extended and the feed product fluids are poured separately into the two sections created by use of the partition 30. The cap 6 already has the lines 7 and 8 in place through it and is closed onto the container, lines 7 and 8 joined to valves 9 and 11 respectively and thence to junction 10 and exit line 13. Application of pressure through entry 36 causes movement of the piston 34, 32 and 31 forcing the feed products out via lines 7 and 8.

FIG. 4 is a schematic longitudinal section through a cylindrical drum 19 having in the curved side 40 a hole 41 and in the end face 22 a second smaller hole 43, fitted with cap 44. In hole 41 is a cover 25, shown in more detail in FIG. 5. Lines 7, 8, 13 and junction 10 and valves 9, 11 and 14 are as described in FIG. 1. Inside drum 19 are located two bags 16 and 17, into which are sealingly joined product lines 7 and 8.

FIG. 5 shows a transverse section through cover 25, which has three cooperating parts, an annular cap 26 bearing on a plug 27, which bears in turn on an annular insert 28, which engages the drum wall 29. Cap 26 has an open centre 30 and a circumferential dependent side 31 which is internally threaded to engage corresponding external threads of the insert 28. Insert 28 has a broader portion 32 threaded to engage side 31 and a narrower portion of shank 33, which is externally threaded to engage drum wall 29. Plug 27 has a pair of outer orifices 34 leading to narrower internal orifices 35 into which are received product lines 7 and 8. Plug 27 has an outwardly radially extending lip 36, which bears upon an annular sealing washer 37, located in a recess 38 in the broader portion 32 of insert 28. In use insert 28 is threaded into the drum wall 29, washer 37 is placed in recess 38, plug 27 is then located into insert 28, and then cap 26 is threaded onto insert 28 locking cap to insert to drum and holding plug 27 firmly in place.

The embodiment of FIGS. 4 and 5 may be used in the same way as those of FIGS. 1 and 3 apart from the contents of bags 16 and 17 flowing out to junction 10 and exit line 13 under gravity.

What is claimed is:

1. A container for containing fluids, said container comprising a wall defining an interior, which comprises at least one collapsible partition which with said wall or another partition defines at least two internal chambers, a fluid product line leading from each chamber to a junction for product lines from at least two of said chambers to produce a mixed product, means for delivering a desired ratio of fluid products in said mixed fluid product comprising at least one valve capable of allowing different flow rates of material through it, an exit line from said junction for said mixed fluid product, and means for reversibly closing said exit line.

2. A container as claimed in claim 1 which comprises a valve on each of two or more product lines, the position of the valve being capable of being varied to give different overall ratios at the junction.

3. A container as claimed in claim 1 in which said junction is in a valve which is a proportioning valve capable of adjustment to allow different flow rates through different inlets.

4. A container as claimed in claim 1, which comprises at least one means allowing transmission of pressure across said wall.

5. A container as claimed in claim 1, which is not pressurizable to above 1.1 bar.

6. A container as claimed in claim 1, which is pressurizable to above 1.1 bar.

7. A method of dispensing at least two fluids into a third fluid, which method comprises:

providing a container as claimed in claim 1, containing said fluids separately in the chambers of said container, passing said fluids through said product lines to meet at said junction, and passing said fluids through said exit line into said third fluid under the influence of gravity.

8. A method of dispensing at least two fluids into a third fluid, which method comprises:

providing a container as claimed in claim 4, containing said fluids separately in the chambers of said container, applying pressure to said pressure transmission means, causing at least partial collapse of at least one partition and egress of said fluids from said chambers via said product lines, passing said fluids through said lines to meet at said junction, and passing said fluids through said exit line into said third fluid.

9. A method as claimed in claim 7, wherein each of said at least two fluids comprises a fuel or lubricant additive.

10. A method as claimed in claim 7, wherein said third fluid is a fuel or lubricant.

11. A method as claimed in claim 10, wherein said fluid is a fuel selected from the group consisting of gasoline, diesel, jet fuel, heavy fuel oil, marine fuel oil, aviation gasoline and kerosene.

12. A container as claimed in claim 4, which is not pressurizable to above 1.1 bar.

13. A container as claimed in claim 4, which is pressurizable to above 1.1 bar.

14. A method of dispensing at least two fluids into a third fluid, which method comprises:

providing a container as claimed in claim 13, containing said fluids separately in the chambers of said container, applying pressure to said pressure transmission means, causing at least partial collapse of at least one partition and egress of said fluids from said chambers via said product lines, passing said fluids through said lines to meet at said junction, and passing said fluids through said exit line into said third fluid.

15. A method as claimed in claim 8, wherein each of said at least two fluids comprises a fuel or lubricant additive.

16. A method as claimed in claim 13, wherein each of said at least two fluids comprises a fuel or lubricant additive.

17. A method as claimed in claim 8, wherein said third fluid is a fuel or lubricant.

18. A method as claimed in claim 9, wherein said third fluid is a fuel or lubricant.

19. A method as claimed in claim 15, wherein said third fluid is a fuel or lubricant.

20. A method as claimed in claim 16, wherein said third fluid is a fuel or lubricant.

21. A method as claimed in claim 17, wherein said fluid is a fuel selected from the group consisting of gasoline, diesel, jet fuel, heavy fuel oil, marine fuel oil, aviation gasoline and kerosene.

22. A method as claimed in claim 18, wherein said fluid is a fuel selected from the group consisting of gasoline, diesel, jet fuel, heavy fuel oil, marine fuel oil, aviation gasoline and kerosene.

23. A method as claimed in claim 19, wherein said fluid is a fuel selected from the group consisting of gasoline, diesel, jet fuel, heavy fuel oil, marine fuel oil, aviation gasoline and kerosene.

24. A method as claimed in claim 20, wherein said fluid is a fuel selected from the group consisting of gasoline, diesel, jet fuel, heavy fuel oil, marine fuel oil, aviation gasoline and kerosene.

* * * * *